Figures 1, 8, 9:
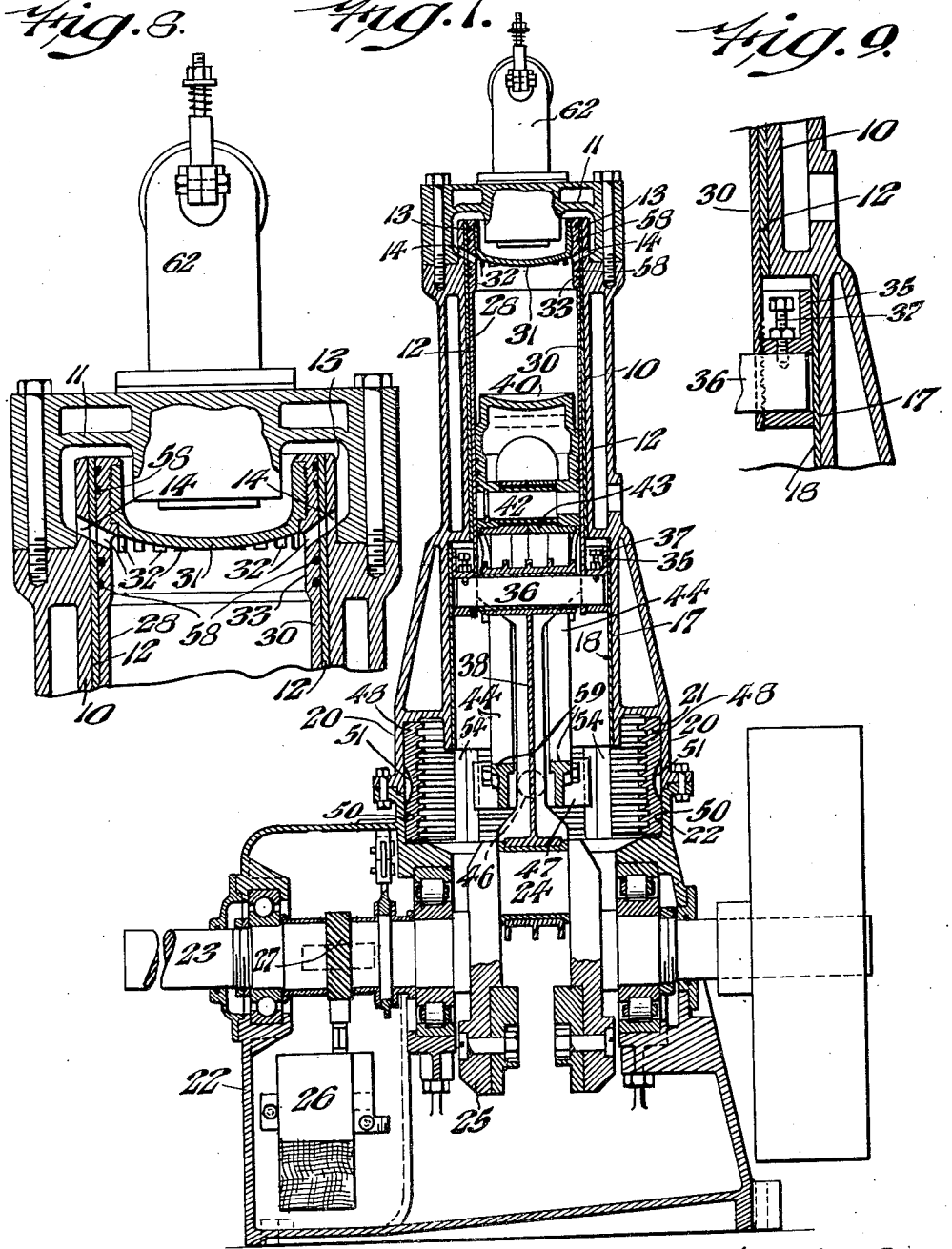

Aug. 17, 1937.  E. B. WILFORD ET AL  2,089,989
INTERNAL COMBUSTION ENGINE
Filed July 24, 1933    3 Sheets-Sheet 1

INVENTORS.
EDWARD BURKE WILFORD,
FREDERIC L. VAN ALLEN,
BY
Frank H. Borden
ATTORNEY

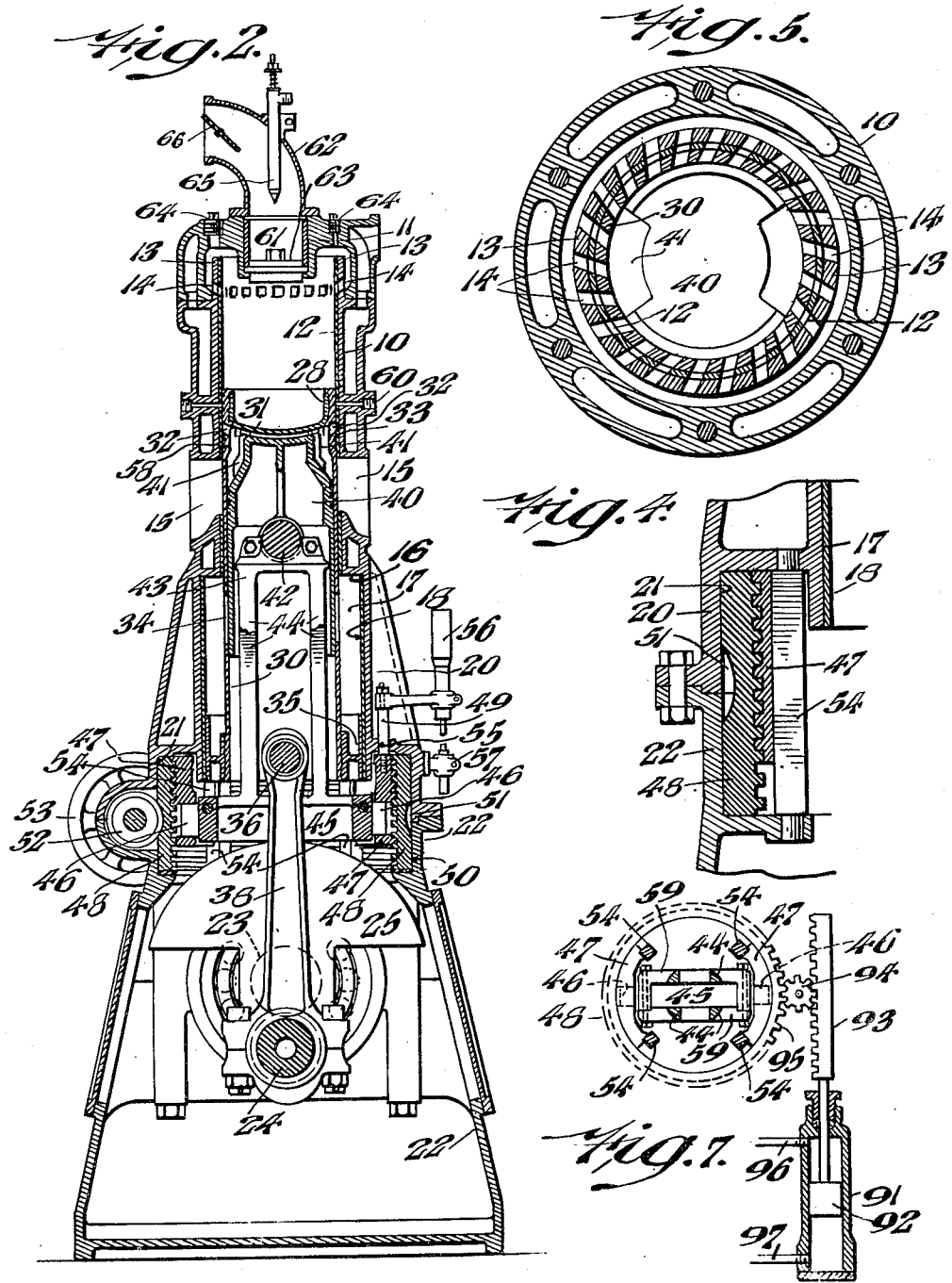

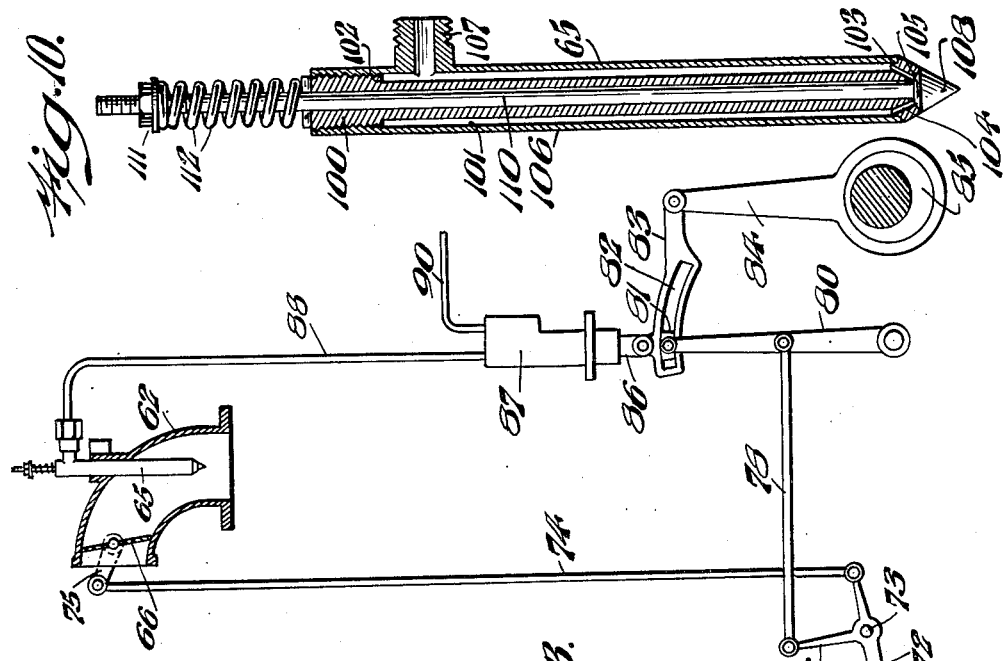

Patented Aug. 17, 1937

2,089,989

UNITED STATES PATENT OFFICE 2,089,989

INTERNAL COMBUSTION ENGINE

Edward Burke Wilford, Merion, and Frederic L. van Allen, Philadelphia, Pa.; said van Allen assignor to said Wilford Application July 24, 1933, Serial No. 681,822

5 Claims. (Cl. 123—48)

This invention relates to Internal Combustion Engines.

Although, as will be pointed out, the invention is applicable with perfect propriety to large motors, it will be illustrated and described in its relations to small motors such as, with certain modifications, would be applicable to aircraft, automobile, and stationary marine purposes, etc.

As Diesel engines have been developed heretofore with their advantages of relative security from fire owing to the use of relatively non-volatile fuels, and relatively low operating costs, there have arisen certain marked disadvantages which, among others, might be summarized as follows:

In small engines the quantity of fuel injected is so minute as to present great difficulty in proper handling and injection; the compressed air is so dense when compressed to the point necessary to secure firing temperatures as to present a relatively impenetrable barrier precluding adequate distribution of the injected fuel over the entire area of the piston, which causes uneven explosion pressure on the piston with a consequent failure to develop full power; in engines of the Diesel type running to 500# pressure of air in the explosion chamber, it is necessary to provide between 2000 and 3000# of pressure per square inch to inject and spray fuel, in small engines particularly the handling of such high pressure on the fuel oil results in serious variations in the small amounts of fuel injected into the cylinder upon the arising of any leaks (as from wear for instance). In the fuel oil pump or line; in general attempts to throttle engines of the Diesel type have been unsatisfactory causing uneven and inefficient running, and such engines have been possessed of appreciable time lags in responding to open throttle conditions after such throttling, as the only manner of throttling engines of the Diesel type presented heretofore, so far as known, have involved variation of the amount of fuel injected while maintaining a substantially constant volume of air it will be clear that the explosion resulting from a sharply reduced oil or fuel charge will fill but part of the combustion chamber and consume but a small portion of the oxygen trapped in the cylinder and the unburned portions of the air charge will act as a cooling agent to reduce the efficiency of the engine, while in small engines, already possessed of sufficient difficulty in injecting minute quantities of oil at full loads and full throttle conditions, attempts to throttle by reducing the charge of injected oil presents a quantity of oil so small as to be substantially unmanageable causing erratic running and frequent stopping of the motor; it should not be overlooked as a serious defect of motors of the Diesel type that the presence of an injection nozzle in communication with the exploding mixture invariably results in carbonization of the nozzle to a degree sufficient at least to vary the charge and frequently to so reduce it as to stop the engine. In every such case it is a source of trouble causing relatively frequent shut downs for cleaning the nozzles.

In conventional Diesel and other internal combustion engines the stresses due to explosion are carried down through the cylinder head, cylinder head bolts and cylinder walls which have to be made strong and heavy enough to withstand lateral and longitudinal pressure. Obviously this constructional necessity increases the weight to an undesirable degree. As an attendant factor has been the relatively slow speed of such conventional Diesels. The heavy character of conventional Diesels prior to this invention has given rise to a further unfavorable attribute in that the high heat attained from the combustion has set up great internal stresses in the cylinder head and other parts of the engine due to uneven thickness of metal and unequal transfer of heat. These distorting stresses, usually most pronounced at the exhaust valve opening frequently cause rupture of the metal as there is customarily no freedom for expansion of the heated parts. The foregoing, while not exhaustive, summarizes some of the major points of criticism of present conventional Diesel design.

It is among the objects of this invention to provide an internal combustion engine in which; substantially all of the disadvantageous features of prior constructions are obviated; general improvements in the art are achieved; either volatile or relatively non-volatile fuels may be used; a thorough intimate admixture of fuel and air is achieved prior to combustion; uniflow scavenging is secured; the fuel injection nozzle is out of communication with the exploding charge; the fuel injection nozzle is kept cool and remote from the heat of explosion; the fuel injection nozzle discharges its spray of fuel against substantially atmospheric pressure; the motor can be throttled and its speed reduced while maintaining approximately its full operating efficiency at all speeds; a coarse mixture of air and fuel is processed in the motor itself to present a finely subdivided intimate complete combustible charge prior to its spontaneous combustion; the motor is extremely light and of relatively high speed; the reciprocating parts are cushioned at each end of the stroke to prevent vibration and wear; means are provided for varying the compression space in the firing cylinder to accord with variations in throttle conditions of both air and fuel; the volumetric capacity of the explosion chamber is varied automatically with throttle conditions of air and fuel; complete scavenging of the exhaust gases is attained; the ratio of air and fuel is maintained constant regardless of the speed of the engine; the ratio of air and fuel to the volumetric capacity of the firing chamber is maintained constant despite variations in the volume of air and proportional quantity of fuel; a sleeve piston reciprocates relative to an adjustable piston and the latter is so mounted as to have universal lateral adjustment to accord with slight misalignments of said sleeve piston; a compressed charge of air and fuel is permitted to expand to cool part of the sleeve piston; a closed cylinder, a sleeve piston and an adjustable relatively fixed piston are assembled which will efficiently burn any kind of fuel substantially regardless of its degree of volatility; there is included a firing chamber with means for mixing the fuel and air outside of the firing cylinder, internally carbureting the mixture as it passes into the firing chamber to secure uniformity and efficiency of combustion; firing efficiency for all positions of the throttle is maintained; there is combined simplicity of structure, lightness of weight and the flexibility of the ordinary internal combustion engine with the ability to burn any grade of fuel and which will also secure the reliability of conventional Diesel engines under full load conditions; the engine is reversible; and many other objects and advantages as will become more apparent as the description proceeds.

In the accompanying drawings forming part of this description:

Fig. 1 represents a vertical section through an illustrative form of engine according to this invention, partially in full lines, Fig. 2 represents a transverse vertical section of the same with the sleeve piston in a different position of adjustment, Fig. 3 represents a fragmentary horizontal section through a part of the motor according to this invention with a diagrammatic illustration of the means coordinating the air, fuel and ring adjustments, for changing position of fixed piston, Fig. 4 represents a fragmentary vertical section of a detail, Fig. 5 represents a fragmentary horizontal section through the sleeve piston and cylinder showing the angular disposition of the transfer ports and outer cylinder head with water jacket, Fig. 6 represents a diagrammatic cycle of operations of the motor, Fig. 7 represents hydraulic means for operating threaded ring 48 to vary position of fixed piston, Fig. 8 represents a vertical section of cylinder head, upper part of cylinder and sleeve piston, partly in full lines, Fig. 9 represents a fragmentary vertical section showing the sleeve piston reinforcing ring with its slide, and Fig. 10 represents a section of a fuel nozzle.

The illustrative engine disclosed and with relation to which the following description attaches, is obviously capable of many modifications and changes some of which may be pointed out later herein. Thus, although for purposes of clarity the expository motor is illustrated as a single unit vertical motor, it will require but slight changes to form multiple units, whether vertical in line, radial in a substantial plane, or opposed. Clearly the units may be disposed in longitudinal alignment in pairs. However, as noted, a single unit is disclosed. For certain purposes the disclosure is as of a test engine, although those features peculiar to test engines may be obviated without affecting the utility and operativeness of the device.

In its simplest form the invention described herein comprises a fixed cylinder, an adjustable abutment or piston, and a sleeve piston reciprocable relative to both.

The engine may comprise a cylinder and cylinder head of a light alloy, as certain alloys of aluminum, as 10 and 11 respectively, having suitable water jackets or water passages in the case of a water cooled engine, or may be suitably finned for air cooling. If the cylinder and cylinder head are of stronger and heavier material, such as cast iron and the like, then the steel liner 12 disclosed as a reinforcement and wear resisting agent may be omitted. It is to be noted that the vertical wall 13 of the cylinder is continued up into the head 11, and has, with the sleeve liner 12, a plurality of transverse slightly downwardly directed ports 14. Preferably the ports 14 are each angularly divergent from the radii of the cylinder so as not to converge at a common center, but so as to be partially tangential thereto, that is, substantially midway between being radial and tangential.

The cylinder and liner have diametrically opposite exhaust ports 15 of appreciable vertical extent. The liner 12 terminates substantially at the peripheral shoulder 16, forming an enlargement of annular or other form 17 of the cylinder toward the base thereof, in which a secondary steel liner 18 may be shrunk to form a bearing surface for the sleeve piston guide to be described. At the lower end the cylinder 10 is integral with the upper part of the crank case, as at 20, which latter has a recess 21 suitable to receive a threaded ring to be described.

In the lower part 22, of the crank case, there is journalled the crank shaft 23 having the crank pin or throw 24, and carrying suitable counterweights 25. The crank shaft is suitably bored and drilled for oil lines communicating with an oil pump 26, driven by the crank shaft, as by the gear 27, or the like.

Slidably mounted in the cylinder and in the sleeve 12 therein, is the sleeve piston 28, comprising the elongated skirt 30, and the recessed head 31. The sleeve piston 28 has ports 32 passing through the skirt and through the reinforcing enlargement 33 of the head, which are substantially tangential to the lower surface of the recessed head 31, and in such angular relation to the piston as to register with the respective ports 14 in the cylinder and head. The sleeve piston has exhaust outlets or ports 34 such as to register with the exhaust ports 15 during the reciprocation of the sleeve piston. At the lower edge of the skirt a reinforcing annular or other guide 35 is rigidly attached, and forms with the skirt a bearing for a wrist or connecting rod pin 36. The sleeve piston may be secured firmly to the pin 36 by suitable means such as set screws 37, or the like. The annular or other guide slides in the liner 18 in recess 17, and forms such reinforcement for the sliding sleeve as to absorb all lateral movements, take out side sway, and insure that the only motion of the sleeve piston is reciprocatory without bending stresses. This arrangement, whether by an integral guiding sleeve, as shown, or integral bosses, is a feature of structural importance in the strength and long life of the motor.

A connecting rod 38 is pivotally mounted on crank pin 24 and is pivotally mounted on the wrist pin 36.

A floating abutment is disposed within the sliding piston, and comprises a piston head 40 disposed to extend vertically above the lower edges of the exhaust ports 15, and having opposite side edges cut away as at 41 to facilitate flow of exhaust outlets. The floating piston is mounted in any desired manner for pivotal association with a transverse pin 42 carried on the upper end of the supporting frame 43, having the pillars 44 horizontally spaced from each other to form clearance for the vertically reciprocating wrist pin 36 of the sleeve piston, and also to form clearance for the connecting rod 38. The supporting pillars or columns are preferably four in number and are joined at the bottom in a cage 59 having a slot 45 elongated in the direction of swing of the connecting rod. It is a feature of importance the the floating piston has slight lateral movement axially of the pin 42 relative to the supporting frame.

The cage 59 has horizontally extending coaxial trunnions 46 rigidly mounted thereon, the axis of which is at right angles with the axis of pin 42. The trunnions are journalled in shoes 47 in which they have a slight axial horizontal movement and which have external threads such as to mesh with the closed internally threaded ring 48, and to afford lateral movement of the supporting frame axially of the gudgeons (as noted). The floating piston is therefore possessed of universal horizontal adjustment relative to the vertical axis of the cylinder 10 and of the sleeve piston 28. It will be clear that from the structural standpoint this ease of adjustment precludes undue wear and stresses such as would be incident to slight inequalities of floating piston and the sleeve piston. It will be understood that the threaded ring 48 is rotatably mounted in a recess 21 of the upper part of the crank case and of a complementary recess 50 in the lower half of the crank case.

The threads of the ring and the shoes are preferably square in section, rather than tapered so as to permit slight horizontal relative movement of the shoes and the ring without unmeshing and without any attendant vertical relative movement. The outer periphery of the ring 48 has a worm gear groove 51 in mesh with a worm 52, rotatable in any desired manner, as by the hand wheel 53, in a test engine, or by any suitable motor as desired, or in connection with the automatic features to be described. It will be clear that the vertical positioning of the floating piston or abutment 40 is variable in accordance with rotations of the threaded ring 48, and that slight horizontal adjustments of the piston can be made without affecting the vertical positioning. For multiple units, as in a line engine the rings may be replaced with a longitudinally threaded rectilinear cam or wedge or the like extending longitudinally past each unit (not shown).

The shoes 47 will be guided vertically to maintain intimate meshing engagement of the shoes with threads of the ring, and to obviate rotational tendencies of the shoes. To this end fixed vertical guide rods 54 may be mounted in webs of the upper and lower crank case sections fitting suitable recesses in the shoes. For test or other purposes a guide element 49 slidable in guiding aperture 55 may carry an indicating arm 56 movable vertically relative to the fixed stop 57. It will thus be that the relative position of the floating piston can be noted by the clearance between the arm 56 and stop 57.

Referring again to the cylinder head, after noting the presence of sets of rings, as 58, on the sleeve piston and on the floating abutment, as may be desired, and lubricating openings 60, it will be observed that the cylinder head 11 has an air inlet channel 61 communicating with the manifold 62, and has a leaf valve 63 closing the channel but capable of opening under suction from within the cylinder or by any suitable mechanical means. The head has also, for test purposes relief valve openings 64, which are normally plugged. Extending vertically in the conduit or manifold in concentric relation to the air inlet channel, is the fuel nozzle 65. The latter is preferably a nozzle having a spray tip, and the emission of spray is regulated by a piston of variable stroke. With a short stroke, a small quantity of oil is sprayed, and with a longer stroke, an increased volume of fuel oil is sprayed. The air conduit is preferably provided with a volume regulator such as a butterfly valve 66, the closing of which restricts the flow of air so as to reduce the quantity drawn into the cylinder.

As will later be described, it is preferred that an automatic or manual device be provided which simultaneously varies the air inlet, the oil volume sprayed and the angular disposition of the threaded ring 48.

It will be observed that with the mechanism so far described the upper side of the sleeve piston, working in the cylinder 10 forms a primary compression space or chamber, while the lower side of the sleeve piston head and the sleeve piston, working relative to the floating abutment or stationary piston, comprises a secondary compression space or firing chamber.

It will be observed further, that although the diameters of the cylinder 10 and the sleeve piston 28 are but slightly different so as to present but small differences in volumetric capacity from diameter differences alone, and although the actual stroke of the sleeve piston in each direction, or relative to each compression space or chamber, is the same, the effective working strokes are appreciably different, owing to the opening of the exhaust ports for an appreciable travel of the sleeve piston. This latter may be made more clear by reference to the cycle of port operations diagrammatically and illustratively disclosed in Fig. 6.

Referring to Fig. 6, and appreciating that the exact degrees of rotation attaching to each port controlling action may vary within wide limits according to requirements, it will be noted that the sleeve piston goes up on the power stroke, (in the secondary chamber) and on compression (in the primary chamber) from bottom dead center of the crank shaft approximately 129° when the first registration of ports 34 with fixed exhaust ports 15 occurs. During this interval the initial explosion pressure has been reduced to a degree such that its power component is small, and the burnt gases start rushing through the exhaust ports. This exhaust as an incident of its own pressures continues for approximately 20°. During this activity in the firing or secondary compression chamber, the air and fuel trapped in the primary compression space have been compressed, and the heat of compression has assisted in processing the mixture to reduce the coarseness to a fine intimate mixture. Thus with the exhaust ports still open, and after approximately 149° of upward travel, the transfer ports 32 register with transfer ports 14 in the primary chamber. The mixture in the primary chamber, is then divided into a plurality of independent streams which are forced through restricted passages as noted, into the secondary chamber. This is the atomizing and carbureting step in the processing of the mixture.

Passage of the compressed mixture, in a plurality of streams, is substantially tangential to the arcuate head of the sleeve piston so that as the streams emerge in the sleeve piston they are permitted to expand, as there is by then no appreciable pressure remaining in the secondary chamber, owing to the prolonged opening of the exhaust ports. The instant expansion results in a desirable heat absorption from the head of the sleeve piston, thus cooling the head. Owing to the angular direction of delivery of the plurality of streams in the sleeve piston in the secondary chamber, the streams, (owing to their tendency to spread after leaving ports 32) being directed in paths angularly divergent from the radial, form a substantially planar stratum of mixture, whirling about the axis of the sleeve piston. It is to be observed that the angle of entrance of each stream is such, substantially between the center of the piston and the sleeve walls, as to prevent the building up of a high pressure in the center of the secondary chamber with its resultant downward flow in the center and an upward flow of burnt gases at the walls induced by such flow directed radially instead of quasi-tangentially as described. Moreover the jet of one port kills the vacuum created by the next, and the incoming gas is kept practically on a level plane. Simultaneously high turbulence is created.

The inrushing mixture of air and fuel enters the secondary chamber when the sleeve piston is approximately 31° from top dead center and continues to rush in during the remainder of the upward stroke, and for an appreciable interval after top dead center the transfer ports 14 and 32 remain in registration to permit the transfer of nearly but not quite all of the compressed mixture. As can be noted from the diagram the transfer ports are in partial or total registration for approximately 62° of crank shaft rotation.

During the transfer of compressed air and fuel from the primary into the secondary chamber the exhaust ports of the secondary chamber remain open so that during the upstroke of the sleeve piston there is successively the opening of the exhaust ports and maintaining the opening for approximately 20° of crank shaft travel, then the opening of the transfer ports during which the exhaust ports remain open. The inrushing stratum of mixture of air and fuel forms in effect an air piston pushed downwardly in the secondary chamber by the pressure from above and forcing the burned gases downwardly out through the exhaust ports. While it is recognized that the whirling air piston of combustible fuel may inter-mingle slightly with the burned gases and that the final exhaust products may comprise such inter-mingled portions of burned and unburned gases, yet in the main such slight inter-mingling will be inconsequential in view of the complete uniflow scavenging of the burned gases which is attained. The complete scavenging is secured not only as an incident of the transfer of combustible gases into the secondary chamber on the upstroke of the sleeve piston but is facilitated and rendered complete by the keeping of the exhaust ports open after the sleeve piston reaches top dead center and begins to descend. While during the first approximately 31° of crank shaft rotation after top dead center marks the closing of the transfer ports, as an incident to descent of the sleeve piston, there is a further interval of approximately 20° during which the secondary chamber is completely closed at the top but is open toward the bottom (at the exhaust ports) so that the descending sleeve piston forces the more or less impure gas at the bottom of the chamber out through the exhaust ports. This last mentioned approximately 20° of travel of the sleeve piston toward the floating piston or abutment completes the scavenging of the secondary chamber and marks the initiation of the secondary compression of the clean mixture when the sleeve piston has descended far enough to cut off the exhaust openings. It will thus be observed that the effective stroke of the sleeve piston as regards the secondary chamber does not begin until approximately 51° of crank shaft rotation after top dead center and insures high fuel efficiency.

It can thus be easily understood that this engine can run in either direction as in the case of an ordinary two cycle engine.

The pure mixture of air and fuel entrapped in the secondary chamber is of approximately atmospheric pressure just as the exhaust ports close. The question of compressing this mixture to such a degree as to secure spontaneous combustion is a matter of clearance of the sleeve piston and the floating or stationary piston. It will be noted as a feature of great importance in the invention that the floating piston is so arranged as to vary the compression space relative to the sleeve piston. In the illustrative disclosure this variation is attained by varying the vertical positioning of the floating piston. Again purely illustratively the vertical positioning is affected by relative rotation of the threaded ring and the shoes 47. Obviously, lever or hydraulic means (as shown in Fig. 7), or the like, may be utilized. The hand wheel device shown in Figs. 2 and 3 may be utilized to vary the vertical positioning of the floating piston, without change in volume of fuel and air, as may be desired as the grade or volatility of the fuel is varied, and therefore the flash point is varied, so that the clearance between the floating piston and the sleeve piston may be so placed as to coordinate the pressure temperature with such flash point. Obviously various mechanical or other control devices may be used to secure proper floating positioning of the piston independently of the fuel and air controls, and thereafter the synchronized control of fuel, air, and displacement may occur.

In Fig. 7 there is disclosed a fluid pressure cylinder 91, containing a piston 92 connected to a rack 93. Preferably, although obviously not necessarily, through a gear 94, movement of the rack 93 may be translated into rotary motion of the shoe engaging threaded ring 48, with the teeth 95 of which it is in mesh. Conduits 96 and 97 supply fluid under pressure from any desired source such as the lubricating system of the engine against both sides, respectively, of the piston in the cylinder. Venting either conduit in any desired manner, presents differential pressures resulting in instantaneous rectilinear motion of the rack. Restoring of the equal pressures obviously holds the piston in a fixed position corresponding to an adjusted angular positioning of the threaded ring 48, and therefore to an adjusted vertical position of the floating piston.

To complete the cycle of operations of the invention as regards the fuel injection and processing and considering the sleeve piston to be at top dead center as shown in Fig. 1, rotation of the crank shaft starts the sleeve piston on its downward stroke. For approximately 31° past top dead center the transfer ports 32 and 14 are in some sort of registration, but this has no appreciable effect upon the fuel intake.

The creation of suction incident to downward movement of the sleeve piston causes the flap or leaf valve 63 to open, and in accordance with the degree of opening of the butterfly valve 62 a charge of air is drawn into the primary compression chamber. It will be understood that during this intake of air, the nozzle 65 has sprayed a minute quantity of fuel into the descending air stream passing through the flap valve. It will be understood that the mixture that is then drawn in and entrapped in the primary compression space is a rather coarse mixture, with relatively large globules of fuel such that combustion of the mixture would be faulty.

With the fuel charge, or a reduced charge depending upon the amount of air and fuel drawn into the compression space, the return or upstroke of the sleeve piston closes the valve 63, and initiates the compression of the entrapped charge. The compression of the charge continues until the first registration of the sleeve piston ports 32 with the ports 14 in the cylinder. At this moment, the compressed charge begins to escape through the registering ports. The effect of the transfer, of forcing the charge into a plurality of independent closely confined streams, results in the homogenization of the contents of each such stream, of forcing a more intimate mixture, and of breaking down the relatively large globules of fuel into smaller and more intimately associated finer atomized particles, and thus represents a stage in the processing of the mixture. Another stage (as noted) is represented by the heat to which the mixture is subjected during the compression step, which also contributes to the breaking down of the independent fuel entities. As soon as the independent mixture streams emerge from the ports into the secondary chamber, there are several effects, as noted. The streams passing through the registering ports, being angularly disposed, as already mentioned, relative to the axis of the cylinder, results in the formation of a substantially planar strata of air and fuel, in rotative motion in the secondary chamber. The release of the compression which has characterized the independent streams, results in immediate expansion and drop of temperature, which, being in contact with the lower face of the sleeve piston results in a decided reduction in temperature, resulting in a cooling of the head of the sleeve piston, which otherwise might form a concentration point for heat. Obviously the transfer of heat thus availed of results in a secondary elevation of the temperature of the mixture entrapped in the secondary compression space. In order to compensate for the time factor of flow of the flowing gases the registration of the transfer ports is maintained somewhat after top dead center. As the mixture is finally presented in the secondary chamber it has been atomized and broken down into an intimate and explosive mixture, through compression, heat, turbulence, expansion and reabsorption of heat.

It will be noted that the fuel nozzle sprays its fuel against substantially atmospheric pressures only, is remote from the heat of combustion and hence retains its efficiency under all conditions. It is to be observed further that owing to the intimate finely atomized and processed fuel mixture even a fuel of relative non-volatility is so dispersed as to form a completely combustible charge, such as to burn evenly and completely with practically even explosion pressures throughout the combustion chamber regardless of the size of cylinder, and is also rendered so completely combustible as to spontaneously ignite under lower pressures and lower temperatures than is possible in conventional Diesels.

It is a feature of importance that the only strains on the outer cylinder and cylinder head are incident to the primary compression pressures of perhaps 100# per square inch, and these parts may therefore be of light construction and material. All of the strains incident to explosion are carried downwardly to close concentration about the bearings. Thus the sleeve piston strains carry downwardly through the connecting rod to the crank shaft and thus to the bearings, while the reaction strains on the floating piston carry downwardly through the cage, and trunnions into the threaded ring which transmits same into the lower part of the crank case in close proximity to the bearing, both without passing through the outer cylinder.

Although any sort of nozzle adapted for the purpose may be used yet for certain purposes the nozzle 65 illustrated as a self clearing nondripping injector is preferred. The nozzle 65 comprises an inner cylindrical member 100 having an axial bore cut away throughout the greater portion of its length to form an annular recess or groove 101 between a shoulder 102 and a shoulder 103. Ports 104 extend from the peripheral recess 101 to the concave tapered head 105 adjacent the axial bore. An outer shell 106 is provided which is rigidly and tightly affixed to the cylindrical body 100 at its upper and lower points to form a closure for the groove 101. An intake nozzle 107 communicates with the recess 101 to convey oil pumped through the fuel line 88 to the ducts 104. A conical tip 108 is mounted on a shaft or shank 110 and arranged to seat in the concave face of the head 105 to close the ports 104. The upper end of the shank carries a stop 111 engaged by one end of a helical spring 112, the other end of which abuts the end of cylindrical body 100. It will be understood that after the nozzle has been suitably charged with fuel that each impulse of pump piston 86 thereafter causes a surge of excess pressure to enter the nozzle sufficient to unseat the conical tip 108, against the resisting action of the spring 112 to permit the fuel to pass around the conical tip to mergence with the air. The venting of the excess pressure permits the spring 112 to exert closing pressure on the tip 108 to preclude further emission until the next pump impulse.

Obviously the nozzle 65 may deliver its fuel charge in the intake manifold 62 or directly into the primary compression space with substantially the same fuel consumption, and with a utilization of some portion of the fuel and air mixture as the scavenging airstream. It is contemplated that suitable ports may be provided to permit the fuel injection to be directly into the secondary chamber. In this case, however, the scavenging will be accomplished by the air from the primary chamber, with a consequent slight saving in fuel, but owing to the ignition occurring upon the fuel injection into the secondary chamber its consumption may not be as efficient as when the mixture has been processed and subjected to turbulence, heat, etc., as previously described. It is contemplated also that there may be provided a plurality of fuel injection nozzles, whereby the semi-explosive mixture is processed in the primary chamber and supplemented or complemented by a fuel injection in the secondary chamber. For these reasons the term "mixture" as used herein is intended to include true mixtures of air and fuel as well as mixtures of air without fuel.

Referring to Fig. 3 there is diagrammatically illustrated one form of the invention in which simultaneous or synchronized control of the operation of the fuel supply, air supply, and the positioning of the floating relatively stationary piston are secured. The hand wheel 53 actuating worm 52, in turn controlling the rotations of ring 48, carries a travelling nut 70 disposed on the threaded shank 71 of the worm 52, the movement of which longitudinally of the shank swings a lever 72 about axis 73. The free end of the lever engages pivotally a link 74 connected to a lever 75 upon which the butterfly valve 66 is mounted. A bell crank lever 76 is pivotally mounted on axis 73 and engages pivotally a link 78 which is pivotally attached to the fulcrum shifting lever 80, having the fulcrum block 81 slidable longitudinally in a slot 82 of a piston actuating lever 83. One end of lever 83 is pivotally mounted on connecting rod 84 driven by cam or eccentric 85. Lever 83 is connected to the fuel piston 86 working in a cylinder 87 and connected by a fuel line 88 to the fuel nozzle 65. A fuel oil inlet 90 communicates with the cylinder 87. It will be clear that swinging of the fulcrum lever 80 so that fulcrum block 81 is directly under the fuel piston 86 (as shown) enables rotation of cam or eccentric 85 and oscillation of lever 83 without any appreciable reciprocation of piston 86. Locating the fulcrum block 81 in the opposite end of the slot, provides a maximum reciprocation of the fuel piston 86. Obviously the piston stroke is varied in accordance with positioning of the block 81 in slot 82. It will therefore be observed that the mere rotation of hand wheel 53 simultaneously varies the compression space in the secondary chamber and also varies the opening of the butterfly valve 66 as well as the volume of fuel emitted from the nozzle 65. It will be understood that temporary disconnection of traveling nut 70 from the lever 72 enables rotatable adjustment of the ring 48 without affecting the fuel and air. Thereafter these parts may be coupled to continue synchronized actuations. It will be clear that if desired any suitable hydraulic means might be provided to secure this synchronized adjustment or to secure merely the adjustment of the floating piston independently of the air and fuel when a different compression is desired to meet the requirements of different grades of fuels.

It will be observed, as a feature of importance in the motor, that the sleeve piston is cushioned at each end of its stroke, imparting compression to the mixture in the primary compression chamber on its up stroke, to effectively cushion same, and imparting compression to the mixture in the secondary chamber on its down stroke, thus effectively cushioning its downward stroke. This cushioning reduces vibration to a negligible degree and insures long life to the motor, and counteracts the inertial forces of the reciprocating parts, to reduce wear on the crank shaft and bearings.

It is to be understood that the illustrative disclosure preferably includes an oil injection nozzle, arranged to inject light or heavy fuels, characterized as being relatively volatile, but it is a part of the invention to utilize a conventional carburetor or mixing valve and eliminate the separate injection nozzle. It will be understood that the turbulence, etc., derived from the other parts of the motor as explained, will operate to process or condition the mixture to assist in rendering it capable of spontaneous combustion in the secondary chamber.

It will be understood that spark plugs or other igniters could be placed in apertures such as 60, which would fire the mixture through openings 32, which would ease starting or running, with reduced compression.

It will be clear that this invention combines the advantages of the opposed piston Diesel engine with the flexibility and simplicity of the conventional two cycle internal combustion engine, and has the ability through proper adjustment of the relation of the sleeve piston and the fixed piston, to burn any fuel no matter how highly volatile, or of the heaviest grade including powdered solid fuel. It will have the ruggedness of the sleeve valve motor, without the disadvantages.

It should be clearly understood that this invention is not limited to the particular cycle described in connection with the figures shown, but covers the basic improvement in any type of internal combustion engine in which the mixture is made and processed within the engine, due to the unique arrangement of the cylinder and sleeve piston. It is also within the range of the invention to make the fixed piston partially or wholly reciprocating in relation to the sleeve piston in such a manner as to allow the exhaust ports to close before the intake ports so as to permit super charging of the firing cylinder (not shown).

We claim as our invention:

1. In an internal combustion engine, a stationary piston, means for supporting the stationary piston for universal lateral adjustment while maintaining the proper disposition of the piston axis and comprising a support, a frame journalled on an axis on the support and shiftable axially on said axis, and means journalling said piston on said frame, an axis at right angles to the first mentioned axis of the frame, said piston having movement axially of and on said second axis.

2. An internal combustion engine comprising a stationary piston, the stationary piston having a wrist pin, an elongated support engaging the wrist pin with provision for shifting movement of the piston axially of the pin relative to the support, a journal for the support the axis of which is perpendicular to the axis of said pin, means for pivotally supporting the journal while permitting relative shifting axial movement of the support and said means, the whole so arranged as to permit universal lateral shifting adjustments of the piston.

3. In an internal combustion engine, a support, a relatively stationary piston having means for varying its position including a supporting frame, shoes in which the frame is journalled, and means for changing the position of said shoes, frame and piston relative to said support.

4. An internal combustion engine comprising a piston, a support, and means for moving the piston axially relative to the support comprising a frame engaging the piston, a threaded ring on the support, means for rotating the ring, threaded shoes engaging the ring and arranged for axial movement in response to rotation of said ring, and means engaging the frame and said shoes for causing them to move together.

5. An internal combustion engine including a sleeve-piston and a piston defining a compression space, means for varying the compression space comprising a rotatable threaded element, a shoe threaded in the element and arranged for axial movement in response to relative movement of the threaded element, means connecting the piston and shoe for movement together, and means for relatively moving said element.

EDWARD BURKE WILFORD.
FREDERIC L. VAN ALLEN.